(12) United States Patent
Giziewicz (10) Patent No.: US 10,739,541 B2
(45) Date of Patent: Aug. 11, 2020

(54) OPTICAL CABLE ASSEMBLIES HAVING VARIABLE OUTPUT CURRENT LIMITS

(71) Applicant: CORNING RESEARCH & DEVELOPMENT CORPORATION, Corning, NY (US)

(72) Inventor: Wojciech Piotr Giziewicz, Berlin (DE)

(73) Assignee: Corning Research & Development Corporation, Corning, NY (US)

( * ) Notice: Subject to any disclaimer, the term of this patent is extended or adjusted under 35 U.S.C. 154(b) by 54 days.

(21) Appl. No.: 16/124,784

(22) Filed: Sep. 7, 2018

(65) Prior Publication Data

US 2020/0081207 A1    Mar. 12, 2020

(51) Int. Cl.
*G02B 6/42* (2006.01)
*G06F 1/32* (2019.01)
*G06F 13/42* (2006.01)

(52) U.S. Cl.
CPC ......... *G02B 6/4284* (2013.01); *G02B 6/4202* (2013.01); *G06F 1/32* (2013.01); *G06F 13/4282* (2013.01); *G06F 2213/0042* (2013.01)

(58) Field of Classification Search
CPC ....... G02B 6/4284; G02B 6/4202; G06F 1/32; G06F 13/4282; G06F 2213/0042
See application file for complete search history.

(56) References Cited

U.S. PATENT DOCUMENTS

| | | | |
|---|---|---|---|
| 10,502,910 B2* | 12/2019 | Leigh | G02B 6/3817 |
| 2012/0141132 A1 | 6/2012 | Walker | |
| 2012/0191997 A1 | 7/2012 | Miller | |
| 2016/0043586 A1 | 2/2016 | Wang et al. | |
| 2018/0210158 A1* | 7/2018 | Leigh | G06F 1/26 |

OTHER PUBLICATIONS

International Search Report and Written Opinion of the European International Searching Authority; PCT/US2019/048321; dated Oct. 9, 2019; 11 Pgs.
Everpro; "U3HC, USB3.0 Hybrid Cable"; 2015; 2 Pages; http://www.everprotech.com/Products/5/15.aspx.
Corning Optical Cable; "USB 3.Optical™ Cables"; Downloaded Nov. 14, 2018; 3 Pages; http://www.corning.com/optical-cables-by-corning/worldwide/en/products/usb-optical-cables.html.

* cited by examiner

*Primary Examiner* — John Bedtelyon
(74) *Attorney, Agent, or Firm* — Michael E. Carroll, Jr.

(57) ABSTRACT

Optical cable assemblies with variable output current limits are disclosed. In one embodiment, an active optical cable assembly includes a cable having at least one electrical conductor, a host connector coupled to a first end of the cable, and a device connector coupled to a second end of the cable. The host connector includes a host circuit that determines a current limit of one or more devices coupled to the active optical cable assembly and produces a transmitted voltage in accordance with the current limit on the at least one electrical conductor. The device connector includes a device circuit that detects the transmitted voltage on the at least one electrical conductor and limits a current configured to be provided to a device coupled to the device connector based on the transmitted voltage.

24 Claims, 3 Drawing Sheets

OPTICAL CABLE ASSEMBLIES HAVING VARIABLE OUTPUT CURRENT LIMITS

BACKGROUND

The present disclosure generally relates to optical cable assemblies and, more particularly, optical cable assemblies having variable current limits.

Benefits of optical fiber include extremely wide bandwidth and low noise operation. Because of these advantages, optical fiber is increasingly being used for a variety of applications, including, but not limited to, broadband voice, video, and data transmission. Active optical cables have electrical connectors that communicate data by optical data signals over one or more optical fibers. Particularly, each connector of the active optical cable includes an active optical circuit that converts the electrical data signals present at the connector into optical data signals for transmission over the one or more optical fibers. The connector at the opposite, distal end of the optical cable receives the optical data signals and another active optical circuit converts the optical data signals back into electric data signals for receipt by a connected electronic device.

It may be desirable for the active optical cable to also provide electric power over its length to a connected electronic device. For example, the active optical cable may be configured as a universal serial bus (USB) cable that provides electrical power provided by one electrical device (e.g., a host device) to another electrical device (e.g., a slave device) over one or more electrical conductors within the cable. However, due to ohmic losses in the one or more electrical conductors, the length of the cable is limited. The greater the length of the cable, the greater the voltage drop from one end of the cable to the other. Additionally, the active optical circuits in both ends of the active optical cable draw power from the input voltage of the host device. The voltage drop due to the ohmic losses in the one or more electrical conductors, as well as the power draw of the active optical circuits, may cause the electrical power at the distal end of the optical cable to be outside of specifications. Thus, the active optical cable may be incapable providing enough power to the distally connected electrical device.

If the current is not limited by the active optical cable, the connected device may attempt to draw more current than is available. This may lead to a brown-out and/or damage to electrical components. Electrical cables may communicate current limit requirements of a host device to a connected device by way of side-hand communication on additional electrical conductors. However, active optical cables may not include such additional electrical conductors because they add additional weight, size and cost. Thus, current active optical cable assemblies are not capable of communicating host current limit requirements from a host connector coupled to the host and a device connector coupled to a device.

SUMMARY

In one embodiment, an active optical cable assembly includes a cable having at least one electrical conductor, a host connector coupled to a first end of the cable, and a device connector coupled to a second end of the cable. The host connector includes a host circuit that determines a current limit of one or more devices coupled to the active optical cable assembly and produces a transmitted voltage on the at least one electrical conductor in accordance with the current limit. The device connector includes a device circuit that detects the transmitted voltage on the at least one electrical conductor and limits a current configured to be provided to a device coupled to the device connector based on the transmitted voltage.

In another embodiment, an active optical cable assembly includes a cable including at least one electrical conductor, a host connector coupled to a first end of the cable, and a device connector coupled to a second end of the cable. The host connector includes a host voltage conditioning circuit capable of receiving an input voltage and converting the input voltage to a transmitted voltage, wherein the host voltage conditioning circuit is electrically coupled to the at least one electrical conductor. The host connector further includes a power detection circuit capable of detecting a current limit of one or more hosts coupled to the optical cable assembly. The power detection circuit is communicatively coupled to the host voltage conditioning circuit, and power detection circuit provides the host voltage conditioning circuit with a current limit signal based on the current limit of the one or more devices coupled to the optical cable assembly. The host voltage conditioning circuit produces the transmitted voltage at a voltage level based on the current limit signal. The device connector includes a voltage level detecting circuit electrically coupled to the at least one electrical conductor, wherein the voltage level detecting circuit is capable of detecting the transmitted voltage on the at least one electrical conductor and producing a detected voltage signal corresponding to the transmitted voltage. The device connector further includes a device voltage conditioning circuit electrically coupled to the at least one electrical conductor and capable of converting the transmitted voltage to a device input voltage, and a current limiting circuit electrically coupled to an output of the device voltage conditioning circuit and capable of limiting a current to a device coupled to the device connector. The current limiting circuit receives the detected voltage signal from the voltage level detecting circuit and limits the current provided to the device based on the detected voltage signal.

In yet another embodiment, a method of providing electrical power over an active optical cable assembly having a cable with at least one electrical conductor, a host connector coupled to a first end of the cable, and a device connector coupled to a second end of the cable, includes determining, by the host connector, a current limit of one or more devices coupled to the active optical cable assembly, producing, by the host connector, a transmitted voltage based on the current limit on the at least one electrical conductor, determining, by the device connector, the transmitted voltage on the at least one electrical conductor, and limiting, by the device connector, a current provided to a device coupled to the device connector based on the transmitted voltage.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate embodiments, and together with the description serve to explain principles and operation of the various embodiments.

DETAILED DESCRIPTION

Embodiments described herein are directed to optical cable assemblies having variable output current limits capable of communicating current limiting requirements from a first connector (i.e., a host connector) to a second connector i.e., a device connector) without dedicated electrical conductors. Cable assemblies may communicate current limit requirements of a host device to a device connector and connected device by separate side-channel electrical conductors. However, optical cable assemblies may not include these separate side-channel electrical conductors. Embodiments of the present disclosure communicate current limit requirements from a first connector to a second connector by setting specific voltage levels for a transmitted voltage on one or more electrical conductors used to power a connected device. The second connector receives the transmitted voltage and sets a current limit based on the voltage level. In this manner, the host current limit requirement may be communicated from the first connector to the second connector without requiring additional electrical conductors.

Figure 1:
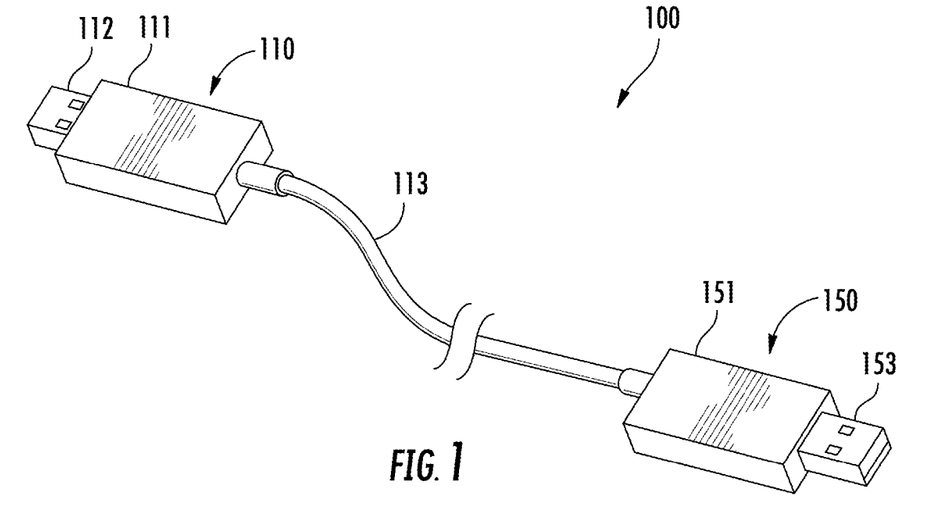
FIG. 1 schematically depicts an example active optical cable assembly according to one or more embodiments described and illustrated herein.

Referring now to FIG. 1, an example active optical cable assembly 100 is schematically illustrated. It should be understood that the example active optical cable assembly 100 of FIG. 1 is provided for illustrative purposes only, and that other configurations and connector types are possible. In the illustrated embodiment, the example active optical cable assembly 100 comprises a first connector 110 at a first end of a cable 113 and a second connector 150 at a second end of the cable 113. The first connector 110 and the second connector 150 are illustrated as Universal Serial Bus (USB) Type-A plugs; however embodiments are not limited thereto. It should be understood that the optical cable assemblies described herein may have any connector type.

The cable 113 comprises one or more optical fibers 127 and one or more electrical conductors 116 (i.e., wires) within a jacket. The one or more optical fibers 127 and the one or more electrical conductors 116 are not shown in FIG. 1. The first connector 110 comprises a housing 111 and a first electrical connector 112 at a face of the housing 111. The first electrical connector 112 comprises electrical contacts for communicating electrical data signals as well as for providing electrical power to an electronic device connected to the second connector 150. Similarly, the second connector 150 comprises a second housing 151 and a second electrical connector 153 at a face of the second housing 151. The second electrical connector 153 also comprises electrical contacts for communicating electrical data signals as well as for receiving electrical power from an electronic device connected to the first connector 110 by way of the one or more electrical conductors within the cable 113. The length of the cable 113 is not limited by this disclosure. In some embodiments, the cable may be greater than 40 m.

As described in more detail below, the optical cable assemblies described herein may be active optical cable assemblies meaning that electrical data signals that are received by the first electrical connector from a connected electronic device are converted to optical signals by an active optical circuit (i.e., an optical transceiver) for transmission over the one or more optical fibers within the cable (e.g., by modulating one or more light sources, such as lasers). These optical signals are then converted back into electrical data signals by an active optical circuit at the second connector (e.g., by one or more photodetectors, such as photodiodes). Thus, the first connector and the second connector each include an active optical circuit capable of electrical-to-optical conversion as well as optical-to-electrical conversion.

Figure 2:
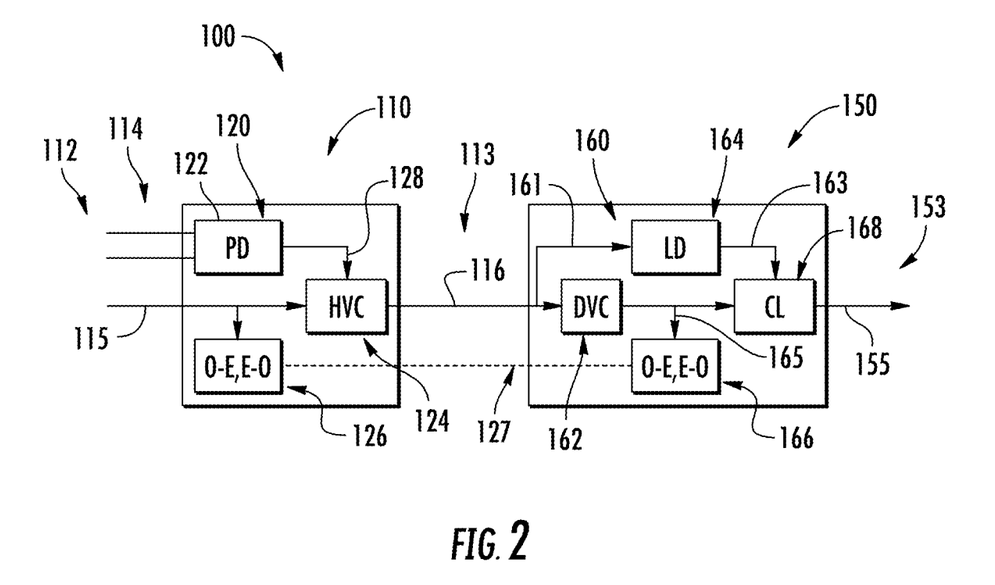
FIG. 2 schematically depicts internal components of an example active optical cable assembly according to one or more embodiments described and illustrated herein.

The example optical cable assemblies further include one or more electrical conductors 116 within the cable 113 for providing electrical power in addition to the one or more optical fibers 127 (see FIG. 2). For example, the cable 113 may include a first electrical conductor for providing a ground reference and a second electrical conductor for providing a positive voltage reference. Thus, an electronic device connected to the second connector 150 may receive electrical power from an electronic device connected to the first connector 110. The active optical circuits of the first connector 110 and the second connector 150 receive electrical power from the electronic device connected to the first connector 110. However, due to ohmic losses on the one or more conductors within the cable 113 due to the length of the cable 113 (e.g., greater than 40 m), and the power draw required by the active optical circuits, not enough electrical power may be present at the second connector 150 to power a connected electrical device within predetermined specifications. Additionally, the gauge of the at least one electrical conductor 116 may also affect ohmic losses. It is desirable to have a thin-gauged electrical conductor 116 to minimize the diameter and maximize the flexibility of the cable 113. Any gauge may be utilized. In one non-limiting example, the gauge of the electrical conductor 116 is 22 AWG providing 6Ω of resistance at 50 m.

Referring now FIG. 2, the internal components of the active optical cable assembly 100 shown in FIG. 1 are schematically illustrated according to a non-limiting example. A host connector 110 (i.e., the first connector 110 shown in FIG. 1) and a device connector (i.e., the second connector 150 shown in FIG. 1) are coupled to opposite ends of a cable 113 having at least one electrical conductor 116 and at least one optical fiber 127. As a non-limiting example, the host connector 110 may be configured as a USB type connector, such as a USB 2.0 or USB 3.0 type connector or the like. It should be understood that other connector types may be utilized, and that embodiments are not limited to USB connectors. The host connector 110 is operable to be connected to a port of a host electronic device (not shown). The device connector 150 may also be configured as a USB type connector, and is operable to be connected to an electronic device (not shown). The electronic device may be a slave device, for example without limitation, a media drive, a camera, a communications device, and the like. The electronic device may receive electrical power from the host device by way of the active optical cable assembly.

The example host circuit 120 includes a host optical transceiver 126 coupled to the first end of the at least one optical fiber 127. The host optical transceiver 126 receives electrical power from an input voltage pin 115 of the host connector (e.g., a Vbus pin of a USB connector). Thus, the electrical power provided by the host device is used not only to charge a connected electronic device, but also to power the host optical transceiver 126 (as well as the device optical transceiver 166 described below). The host optical transceiver is configured to convert electrical signals into optical signals for transmission over the at least one optical fiber 127, and the convert optical signals received from the at least one optical fiber 127 into electrical signals provided to data contacts on the host connector (not shown). The host optical transceiver 126 includes the electrical components for the electro-optical and opto-electrical conversion, such as optical interface application-specific integrated circuit(s), laser diodes (e.g., VCSEL) and photodiodes.

Similarly, a device circuit 160 includes a device optical transceiver 166 configured to convert optical signals received from the at least one optical fiber 127 into electrical signals and electrical signals into optical signals for transmission over the at least one optical fiber 127. The device optical transceiver 166 also receives its electrical power from the host device by way of the at least one electrical conductor 116, as described in more detail below.

Thus, the host optical transceiver 126 and the device optical transceiver 166 also draw power from the host device. As an example and not a limitation, each of the host optical transceiver 126 and the device optical transceiver 166 may draw 200 mW. This power draw further accounts for power that is lost over the active optical cable assembly 100 in addition to ohmic losses described above. Additional power is lost by voltage converters at both ends of the active optical cable assembly 100, as described below.

Depending on how much power is available from the host device, or if supplemental power is injected into the active optical cable assembly 100 as described hereinbelow, the current limit should change. However, the active optical cable assembly 100 does not generally have a side-channel for both ends of the cable to negotiate power availability with one another. Embodiments of the present disclosure provide for the host-side of the active optical cable assembly 100 to inform the device-side how it should limit available current to the coupled electronic device without additional electrical conductors.

As a non-limiting example, a standards-compliant USB 3.X port can supply 900 mA at 4.75-5.25V on its VBus pin. A connected USB 3.X device can consume up to 900 mA at 4.45-5.25 V during operation. The difference in voltages results from ohmic loss on the electrical conductors of the cable. Assuming a 22 AWG cable, this implies an approximately 10 foot maximum passive copper cable length. To supply power from a host to device on an active optical cable assembly with length of 5-50 m, the voltage must be increased to decrease the amount of current flowing through the wires and thereby the ohmic losses.

As stated above, the host and device optical transceivers draw electrical power (e.g., 200 mW) and voltage converters also provide electrical losses (e.g., 90% efficiency). In such a scenario where a host device provides 5V at 4.5 W, only 5V at 3.1 W may be available to an electronic device coupled to the device connector 150. A device attempting to draw 900 mA in this case may result in one of several scenarios: an overcurrent warning at the host, a brown-out of the optoelectronic transceivers causing data faults, or damage to some of the electronics. For this reason, either supplemental power injection or connection to a USB charging downstream port (with 1.5 A available) would be needed at the host end of the active optical cable assembly 100 in order to deliver a full 900 mA at 5V to a connected electronic device.

Embodiments of the present disclosure signal the power available from the host device and/or supplemental power device to the device-side of the active optical cable assembly 100.

The host circuit 120 determines a current limit of one or more devices e.g., the host device) coupled to the active optical cable assembly 100. As described in more detail below, the host circuit 120 produces a transmitted voltage on the at least one electrical conductor 116 in accordance with the current limit of the host device. Thus, the host circuit 120 communicates the current limit capabilities of the host device to the device connector 150 by providing predetermined transmitted voltages on the at least one electrical conductor 116. The device circuit 160 of the device connector 150 receives and interprets these predetermined transmitted voltages and then limits the current provided to the electric device accordingly. For example, a first transmitted voltage may correspond with a first current limit, and a second transmitted voltage may correspond with a second current limit. In this manner, the current limit specifications of one or more devices coupled to the host connector 110 are communicated to the device connector 150 so that the current provided to the device coupled to the device connector 150 may be limited accordingly.

Still referring to FIG. 2, the host circuit 120 further comprises a host voltage conditioning circuit 124 (HVC) and a power detection circuit 122 (PD). The host voltage conditioning circuit may be, for example, a direct-current (DC) to DC converter. The host voltage conditioning circuit is capable of receiving an input voltage (e.g., provided on a $V_{bus}$ contact of a USB connector coupled to a host device) and converting the input voltage to a transmitted voltage on the at least one electrical conductor 116. To reduce ohmic losses on the at least one electrical conductor, the host voltage conditioning circuit 124 may be operable to increase the input voltage such that the transmitted voltage on the at least one electrical conductor 116 is greater than the input voltage.

The power detection circuit 122 is any circuit that is capable of detecting or otherwise determining a current limit of the connected host device. As shown in FIG. 2, the power detection circuit 122 is communicatively coupled to the host voltage conditioning circuit 124. The power detection circuit 122 provides a current limit signal 128 to the host voltage conditioning circuit 124 that instructs the host voltage conditioning circuit 124 to produce a transmitted voltage based on a current limit of the host device.

As an example and not a limitation, the active optical cable assembly 100 may be configured as a USB cable. The power detection circuit 122 may include a USB Battery Charging (USB BC) circuit capable of detecting whether the host port of the host device is a Standard Port or a Charging Downstream Port according to one or more USB Battery Charging standards (e.g., USB Battery Charging standard 3.2.3). The Charging Downstream Port is capable of supplying voltage at a higher current limit than a Standard Port. Particularly, a Charging Downstream Port provides 1500 mA at 5V whereas a Standard Port provides 900 mA at 5V.

The power detection circuit 122 may determine the current limit of the host device by information on contacts 114. In embodiments where the power detection circuit 122 includes a USB BC circuit, the contacts 114 are electrically coupled to D+ and D− lines of the host port. The power detection circuit 122 determines whether the host port is Standard Port or a Charging Downstream Port based on information provided on the D+ and D− lines according to the USB Battery Charging standard.

The power detection circuit 122 may provide the current limit signal 128 to the host voltage conditioning circuit 124 based on whether the host port is a Standard Port or a Charging Downstream Port. The host voltage conditioning circuit 124 then produces a transmitted voltage on the at least one electrical conductor 116 in accordance with the current limit signal 128. When the current limit signal 128 indicates a Standard Port, the host voltage conditioning circuit 124 produces a transmitted voltage at a first voltage level. When the current limit signal 128 indicates a Charging Downstream Port, the host voltage conditioning circuit 124 produces a transmitted voltage at a second voltage level. As an example and not a limitation, the first voltage level may be lower than the second voltage level. As a further example and not a limitation, the first voltage level indicating a Standard Port may be 15V and the second voltage level indicating a Charging Downstream Port may be 30V. It should be understood that any other voltage levels may be utilized, and that any number of individual voltage levels may be provided.

Further, the first and second voltage levels (as well as additional voltage levels) may be applied irrespective of whether or not the active optical cable assembly 100 is a USB cable. The host circuit 120 may include any power detection circuit 122 capable of determining the current limit requirements of the host device, and produce the current limit signals for the host voltage conditioning circuit accordingly.

The transmitted voltage present on the at least one electrical conductor 116 is received by the device circuit 160. In addition to the device optical transceiver 166, the example device circuit 160 illustrated by FIG. 2 comprises a device voltage conditioning circuit 162 (DVC), a voltage level detecting circuit 164 (LD) and a current limiting circuit 168 (CL).

The device voltage conditioning circuit 162 receives the transmitted voltage from the at least one electrical conductor 116 and converts it to a device input voltage that is provided to a connected device at a device power contact 155. For example, the device voltage conditioning circuit 162 may be a DC-DC converter capable of reducing the transmitted voltage to the device input voltage. As an example and not a limitation, the device input voltage may be 5V. However, any device input voltage may be provided depending on the application.

The voltage level detecting circuit 164 (LD) is electrically coupled to the at least one electrical conductor and the current limiting circuit 168. The voltage level detecting circuit 164 detects the voltage level of the transmitted voltage on the at least one electrical conductor. As described above, the voltage level of the transmitted voltage indicates the current limit requirements of the host device (and/or other devices) coupled to the host connector 110. The voltage level detecting circuit 164 also provides a detected voltage signal 163 to the current limiting circuit 168 corresponding to the detected voltage level. The voltage level detecting circuit 164 may be any circuit capable of detecting the voltage level of the transmitted voltage and then passing a signal to the current limiting circuit 168. As an example and not a limitation, the voltage level detecting circuit 164 may include one or more comparators to detect the voltage level of the transmitted voltage and provide the detected voltage signal 163 to the current limiting circuit 168.

The current limiting circuit 168 is electrically coupled to the output of the device voltage conditioning circuit 162. The current limiting circuit 168 receives the detected voltage signal 163 from the voltage level detecting circuit 164, and limits the amount of current provided to the connected device on device power contact 155 based on the detected voltage signal 163. When the detected voltage signal 163 indicates a first voltage level of the transmitted voltage, the current limiting circuit 168 may limit the amount of current provided to the device at a first current limit. When detected voltage signal 163 indicates a second voltage level of the transmitted voltage, the current limiting circuit 168 may limit the amount of current provided to the device at a second current limit. As an example and not a limitation, when the voltage level is 15V, the current limit may be 600 mA, and when the voltage level is 30V, the current limit may be 900 mA. It should be understood that these values are merely examples, and that any voltage levels and current limits may be utilized depending on the end application.

Thus, embodiments of the present disclosure overcome the problem of the active optical cable assembly 100 not including electrical conductors for sideband communication that indicates current limiting requirements of the host device. The device circuit 160 receives information regarding host device current limiting requirements from the host circuit 120 by way of the voltage level of the transmitted voltage and limits the current provided to the device accordingly. This avoids overcurrent situations and prevents issues such as brown-out or damage to electrical components.

In some embodiments, supplemental power may be injected into the host connector to increase the amount of current capable of being provided to the device over what the host device can provide. The supplemental power may be provided by any source, such as a battery or a power supply.

Figure 3:
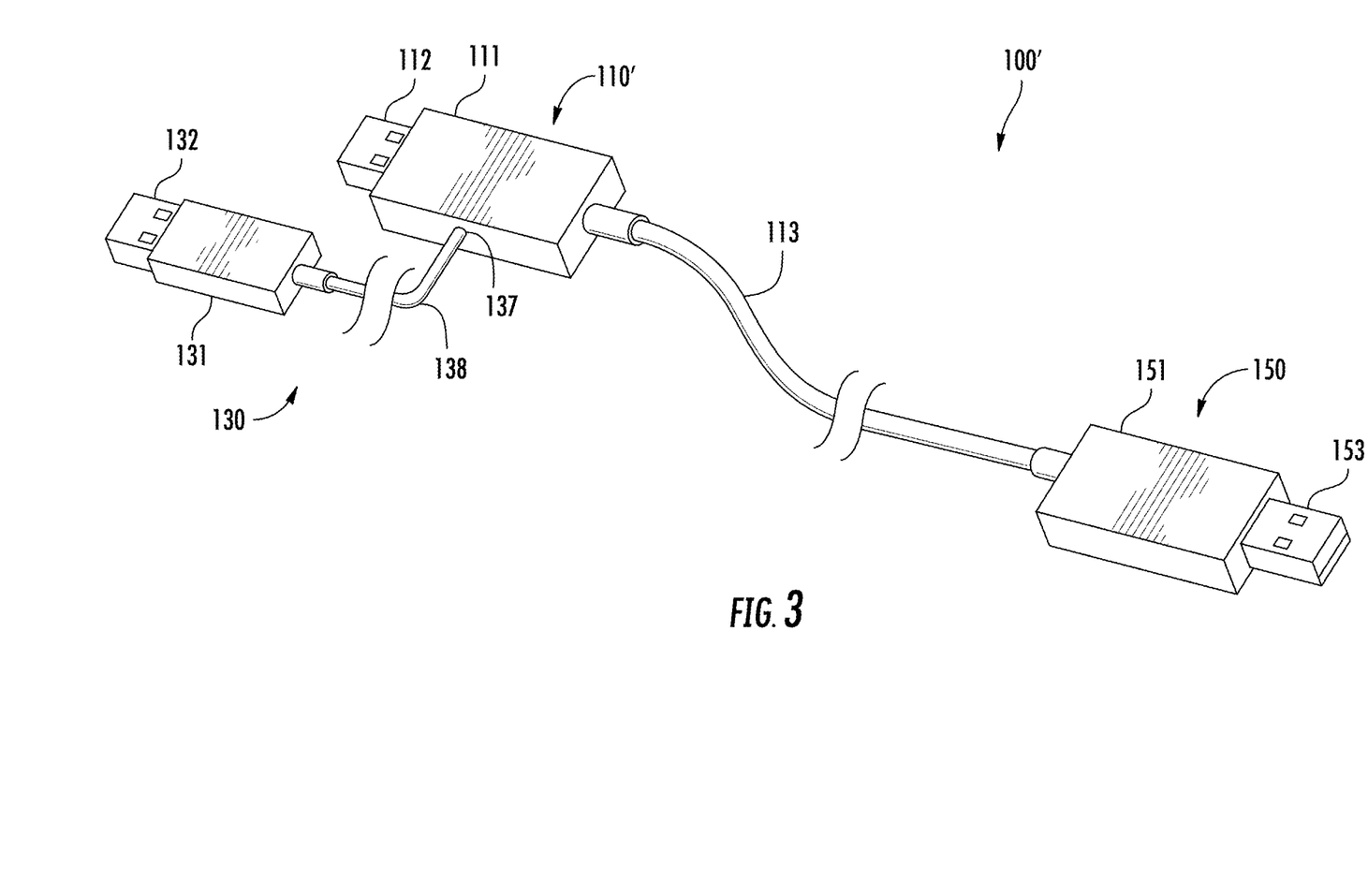
FIG. 3 schematically depicts an example active optical cable assembly having a supplemental power connector according to one or more embodiments described and illustrated herein.

Referring now to FIG. 3, an example active optical cable assembly 100' further comprises a supplemental cable 138 that is coupled to the housing 111 of the first connector 110'. In the illustrated embodiment, the supplemental cable 138 is further coupled to a supplemental connector 130 comprising a supplemental housing 131 and a supplemental electrical connector 132 at a face of the supplemental housing 131. The supplemental electrical connector 132 includes a supplemental voltage contact (not shown) for receiving supplemental input voltage. The example supplemental connector 130 is depicted as a USB Type-A connector similar to the first connector 110. Thus, a user may plug the active optical cable assembly 100 into two USB ports of an electrical device such that electrical power is received from both USB ports. The supplemental electrical power received by the supplemental connector 130 ensures that the electrical power provided at the second connector 150 satisfies desired specifications. It should be understood that embodiments are not limited to supplemental connectors being configured as USB-type connectors, and that any connector may be utilized to connect the active optical cable assembly 100' to a supplemental power source.

In some embodiments, the supplemental cable 138 is permanently coupled to the housing 111 of the first connector 110, such as at location 141. In other embodiments, the supplemental cable 138 may be removably coupled to the housing 111 of the first connector 110. For example, a removable electrical connection may be provided at location 141, thereby allowing the supplemental cable 138 to be connected and disconnected.

Figure 4:
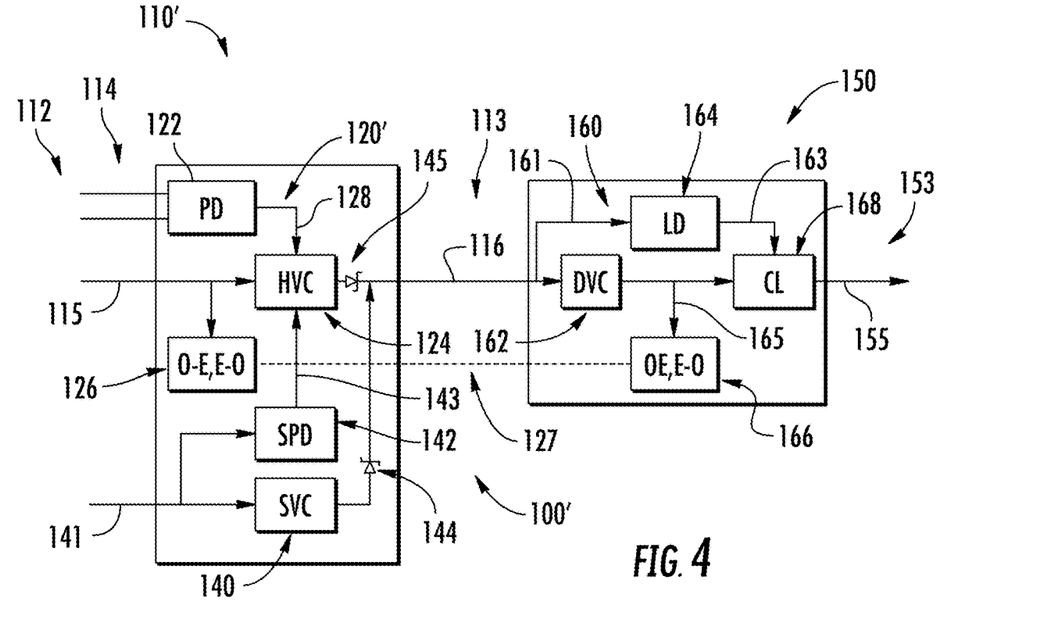
FIG. 4 schematically depicts internal components of the example active optical cable assembly depicted by FIG. 3 according to one or more embodiments described and illustrated herein.

Referring now to FIG. 4, example internal components of the example active optical cable assembly 100' show in FIG. 3 are schematically illustrated. Like the host circuit 120 depicted in FIG. 2, the host circuit 120' of the example active optical cable assembly 100' depicted by FIG. 4 includes a host optical transceiver 126, a power detection circuit 122, and a host voltage conditioning circuit 124. The example host circuit 120' further includes a supplemental power detection circuit 142 (SPD) and a supplemental voltage conditioning circuit 140 (140). The supplemental power detection circuit 142 and the supplemental voltage conditioning circuit 140 are electrically coupled to a supplemental power input connection 141 that may provide supplemental power from the supplemental power source (not shown).

The supplemental power detection circuit 142 is operable to detect the presence of supplemental voltage provided at the supplemental power input connection 141. The presence of supplemental voltage or lack thereof is provided to the host voltage conditioning circuit 124 by a supplemental voltage signal 143. When the supplemental voltage signal 143 indicates a lack of the supplemental voltage at the supplemental power input connection 141, the host voltage conditioning circuit 124 may produce the transmitted voltage at a first voltage level indicative of the lack of the supplemental voltage. When the supplemental voltage signal 143 indicates the presence of the supplemental voltage at the supplemental power input connection 141, the host voltage conditioning circuit 124 may produce the transmitted voltage at a second voltage level indicative of the presence of the supplemental voltage. As an example and not a limitation, when the supplemental voltage signal 143 indicates a lack of supplemental power, the host voltage conditioning circuit 124 may produce a transmitted voltage at 15V, and when the supplemental voltage signal 143 indicates a presence of supplemental power, the host voltage conditioning circuit 124 may produce a transmitted voltage at 30V.

As an example and not a limitation, the host device and the supplemental power supply may each be capable of providing 5V at 900 mA. Therefore, the power provided to the device at the device connector 150 may be 5V at 900 mA without the risk of brown-out or electrical component damage due to losses within the active optical cable assembly 100'.

The supplemental voltage conditioning circuit 140 is operable to convert the supplemental input voltage at the supplemental power input connection 141 to a transmitted voltage at the second voltage level produced by the host voltage conditioning circuit 124. As an example and not a limitation, the supplemental voltage conditioning circuit 140 may be a DC-DC converter. The output voltage of the supplemental voltage conditioning circuit 140 is combined with the output voltage of the host voltage conditioning circuit 124. In some embodiments, Schottky diode 145 and Schottky diode 144 may perform the function of voltage combination to provide the transmitted voltage at the second voltage level on the at least one electrical conductor 116.

The device circuit 160 within the device connector 150 operates in the same manner as described above with respect to FIG. 2.

Embodiments of the present disclosure may also be implemented in optical cable assemblies where the device and the host device negotiate power requirements over the active optical cable assembly. For example, the active optical cable assembly may be a USB Type-C wherein negotiations regarding power requirements between the host device and the device are provided over the CC pins of the host connector and device connector. Because optical cable assemblies do not include an electrical conductor between CC pins, power negotiations cannot occur. Concepts of the present disclosure enable power negotiations to occur between the device and host device even without an electrical conductor between the CC pins of the host device and the device.

Figure 5:
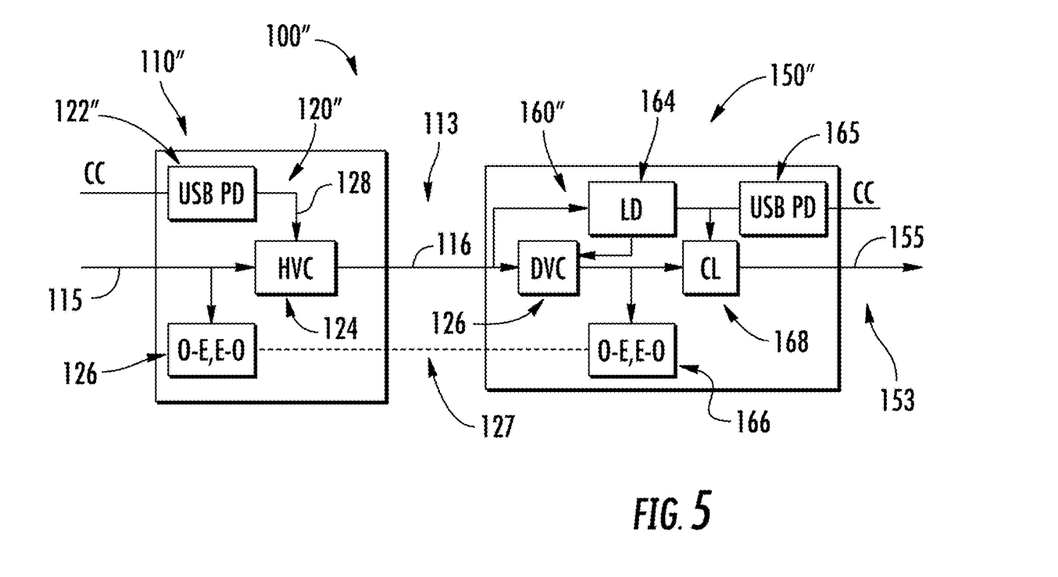
FIG. 5 schematically depicts internal components of an example active optical cable assembly configured as a USB Type-C cable assembly according to one or more embodiments described and illustrated herein.

Referring now to FIG. 5, an example active optical cable assembly 100" configured as a USB Type-C cable is schematically illustrated. The example active optical cable assembly 100" includes a host connector 110" and a device connector 150". The host connector 110" includes a host circuit 120" comprising a host USB PD controller 122", a host optical transceiver 126 and a host voltage conditioning circuit 124. The device connector 150" includes a device circuit 160" comprising a device voltage conditioning circuit 162, a voltage level detecting circuit 164, a device optical transceiver 166 (O-E, E-O), a current limiting circuit 168, and a device USB PD controller 165.

The host device provides power requirements to the host USB PD controller 122" over the CC contact of the host connector 110" in accordance with USB Type-C power delivery protocol. The host USB PD controller 122" may be any integrated circuit or circuit capable of communicating with the host device under the USC Type-C power delivery protocol. The power requirements may include, but are not limited to, a voltage requirement and a current limit requirement. The host USB PD controller 122" sends at least the current limit requirement to the host voltage conditioning circuit 124 by way of a current limit signal 128.

The host voltage conditioning circuit 124 receives the current limit signal 128 and sets the transmitted voltage at a voltage level based on the current limit signal 128. Because USB Type-C includes a range of voltages (5V-20V) as the input voltage ($V_{bus}$) on the input voltage pin 115, the host voltage conditioning circuit may either increase the input voltage, decrease the input voltage, or keep the input voltage the same depending on the voltage level of the desired transmitted voltage. The transmitted voltage may take on a plurality of voltage levels corresponding to a plurality of current limit values set by the host device. In some embodiments, the voltage level also corresponds to the voltage level requirements of the host device.

The voltage level detecting circuit 164 is electrically coupled to the at least one electrical conductor 116 and therefore receives the voltage level of the transmitted voltage. The voltage level detecting circuit 164 is communicatively coupled to the device USB PD controller 165 and provides the voltage level of the transmitted voltage to the device USB PD controller 165. The device USB PD controller 165 provides at least the current limit requirement of the host device to the device by way of the CC contact on the device connector 150. As described in detail above, the current limit requirement is based on the voltage level of the transmitted voltage. The device USB PD controller 165 and the device negotiate a power requirements contract in accordance with the USB Type-C power device protocol. Particularly, the device USB PD controller 165 provides the current limit capabilities of the host device to the connected device. The device then instructs the device USB PD controller 165 regarding its power requirements, such as voltage and current limit. After receiving the power requirements from the device, the device USB PD controller 165 sends a signal corresponding to the device current limit requirement to the current limiting circuit 168. The current limiting circuit 168 then limits the available current provided to the device in accordance with the device current limiting requirement. The current provided to the device may be less than the current limit requirement of the host device. In some embodiments, the device USB PD controller 165 also sends a signal to the device voltage conditioning circuit 162 corresponding to a device voltage requirement. The device voltage conditioning circuit may then set the device input voltage in accordance with the device voltage requirement.

It should now be understood that embodiments of the present disclosure are directed to optical cable assemblies capable of communicating current limiting requirements from a first connector (i.e., a host connector) to a second connector (i.e., a device connector) without dedicated electrical conductors. Particularly, the first connector provides a transmitted voltage on one or more electrical conductors at a voltage level that signals a current limit requirement of the host device to the device connector. The device connector limits the amount of current provided to the device in accordance with the current limit requirement.

It will be apparent to those skilled in the art that various modifications and variations can be made without departing from the spirit or scope of the disclosure. Since modifications, combinations, sub-combinations and variations of the disclosed embodiments incorporating the spirit and substance of the disclosure may occur to persons skilled in the art, the disclosure should be construed to include everything within the scope of the appended claims and their equivalents.

The invention claimed is:

1. An active optical cable assembly comprising:
a cable comprising at least one electrical conductor;
a host connector coupled to a first end of the cable, the host connector comprising a host circuit that determines a current limit of one or more devices coupled to the active optical cable assembly and produces a transmitted voltage on the at least one electrical conductor in accordance with the current limit; and
a device connector coupled to a second end of the cable, the device connector comprising a device circuit that detects the transmitted voltage on the at least one electrical conductor and limits a current configured to be provided to a device coupled to the device connector based on the transmitted voltage.

2. The active optical cable assembly of claim 1, wherein:
the cable comprises at least one optical fiber having a first end coupled to the host connector and a second end coupled to the device connector;
the host circuit comprises a host optical transceiver coupled to the first end of the at least one optical fiber, wherein the host optical transceiver is configured to convert electrical signals into optical signals and optical signals into electrical signals; and
the device circuit comprises a device optical transceiver coupled to the second end of the at least one optical fiber, wherein the device optical transceiver is configured to convert electrical signals into optical signals and optical signals into electrical signals.

3. The active optical cable assembly of claim 1, wherein when the transmitted voltage is within a first range, the device circuit limits the current at a first current limit.

4. The active optical cable assembly of claim 3, wherein when the transmitted voltage is within a second range, the device circuit limits the current at a second current limit.

5. The active optical cable assembly of claim 1, wherein:
the host circuit determines whether a port of a host coupled to the host connector is a standard port or a charging downstream port; and
the current limit determined by the host circuit is lower for the standard port than the charging downstream port.

6. The active optical cable assembly of claim 5, wherein:
the transmitted voltage produced by the host circuit is at a first voltage level when the port of the host is the standard port;
the transmitted voltage produced by the host circuit is at a second voltage level when the port of the host is the charging downstream port; and
the first voltage level is lower than the second voltage level.

7. The active optical cable assembly of claim 1, wherein the host circuit comprises a universal serial bus battery charging circuit capable of determining a current limit of a host coupled to the host connector.

8. An active optical cable assembly comprising:
a cable comprising at least one electrical conductor;
a host connector coupled to a first end of the cable, the host connector comprising:
a host voltage conditioning circuit capable of receiving an input voltage and converting the input voltage to a transmitted voltage, wherein the host voltage conditioning circuit is electrically coupled to the at least one electrical conductor; and
a power detection circuit capable of detecting a current limit of one or more hosts coupled to the active optical cable assembly, wherein:
the power detection circuit is communicatively coupled to the host voltage conditioning circuit;
the power detection circuit provides the host voltage conditioning circuit with a current limit signal based on the current limit of the one or more devices coupled to the active optical cable assembly; and
the host voltage conditioning circuit produces the transmitted voltage at a voltage level based on the current limit signal; and
a device connector coupled to a second end of the cable, the device connector comprising:
a voltage level detecting circuit electrically coupled to the at least one electrical conductor, wherein the voltage level detecting circuit is capable of detecting the transmitted voltage on the at least one electrical conductor and producing a detected voltage signal corresponding to the transmitted voltage;
a device voltage conditioning circuit electrically coupled to the at least one electrical conductor and capable of converting the transmitted voltage to a device input voltage; and
a current limiting circuit electrically coupled to an output of the device voltage conditioning circuit and capable of limiting a current to a device coupled to the device connector, wherein the current limiting circuit receives the detected voltage signal from the voltage level detecting circuit and limits the current provided to the device based on the detected voltage signal.

9. The active optical cable assembly of claim 8, wherein:
the cable comprises at least one optical fiber having a first end coupled to the host connector and a second end coupled to the device connector; and
the host connector comprises a host optical transceiver coupled to the first end of the at least one optical fiber, wherein the host optical transceiver is configured to convert electrical signals into optical signals and optical signals into electrical signals.

10. The active optical cable assembly of claim 8, wherein when the transmitted voltage is within a first range, the detected voltage signal corresponds to a first current limit such that the current limiting circuit limits the current at the first current limit.

11. The active optical cable assembly of claim 10, wherein when the transmitted voltage is within a second range, the detected voltage signal corresponds to a second current limit such that the current limiting circuit limits the current at the second current limit.

12. The active optical cable assembly of claim 8, wherein:
the power detection circuit determines whether a host port of a host coupled to the host connector is a standard port or a charging downstream port;
a current limit of the standard port is lower than a current limit of the charging downstream port;
the current limit signal provided to the host voltage conditioning circuit is a first current limit signal when the host port is the standard port such that the host voltage conditioning circuit produces the transmitted voltage at a first voltage level; and
the current limit signal provided to the host voltage conditioning circuit is a second current limit signal when the host port is the charging downstream port such that the host voltage conditioning circuit produces the transmitted voltage at a second voltage level.

13. The active optical cable assembly of claim 12, wherein the first voltage level is lower than the second voltage level.

14. The active optical cable assembly of claim 8, wherein the power detection circuit comprises a universal serial bus battery charging circuit.

15. The active optical cable assembly of claim 8, wherein the host connector further comprises:
a supplemental power input connection operable to be connected to a supplemental power source;
a supplemental power detection circuit electrically coupled to the supplemental power input connection, wherein:
the supplemental power detection circuit is capable of detecting a presence of a supplemental voltage at the supplemental power input connection and providing a supplemental voltage signal to the host voltage conditioning circuit based on the presence of the supplemental voltage;
when the supplemental voltage signal indicates a lack of the supplemental voltage, the host voltage conditioning circuit produces the transmitted voltage at a first voltage level indicative of the lack of the supplemental voltage; and
when the supplemental voltage signal indicates the presence of the supplemental voltage, the host voltage conditioning circuit produces the transmitted voltage at a second voltage level indicative of the presence of the supplemental voltage; and
a supplemental voltage conditioning circuit comprising an input electrically coupled to the supplemental power input connection and configured to provide the transmitted voltage at the second voltage level to the at least one electrical conductor.

16. The active optical cable assembly of claim 8, wherein:
the power detection circuit of the host connector comprises a host universal serial bus PD controller operable to receive a host current limit requirement from a host coupled to the host connector;
the host universal serial bus PD controller provides the current limit signal to the host voltage conditioning circuit, the current limit signal corresponding to the host current limit requirement;
the device connector further comprises a device universal serial bus PD controller communicatively coupled to the voltage level detecting circuit, the current limiting circuit, and is communicatively coupled to the device when the device is coupled to the device connector;
the device universal serial bus PD controller receives the detected voltage signal from the voltage level detecting circuit, and provides the device with the host current limit requirement;
the device universal serial bus PD controller receives a device current requirement from the device in a PD contract negotiation; and
the current limiting circuit limits the current provided to the device in accordance with the device current requirement.

17. The active optical cable assembly of claim 16, wherein the device current requirement is less than the host current limit requirement.

18. A method of providing electrical power over an active optical cable assembly comprising a cable with at least one electrical conductor, a host connector coupled to a first end of the cable, and a device connector coupled to a second end of the cable, the method comprising:
determining, by the host connector, a current limit of one or more devices coupled to the active optical cable assembly;
producing, by the host connector, a transmitted voltage based on the current limit on the at least one electrical conductor;
determining, by the device connector, the transmitted voltage on the at least one electrical conductor; and
limiting, by the device connector, a current provided to a device coupled to the device connector based on the transmitted voltage.

19. The method of claim 18, wherein when the transmitted voltage is within a first range, the device circuit limits the current at a first current limit.

20. The method of claim 19, when the transmitted voltage is within a second range, the device circuit limits the current at a second current limit.

21. The method of claim 20, wherein:
wherein determining the current limit of the one or more devices comprises determining whether a port of a host is a standard port or a charging downstream port;
when the port of the host is the standard port, the host connector produces the transmitted voltage at a first voltage level corresponding to the first current limit provided by the device connector; and
when the port of the host is the charging downstream port, the host connector produces the transmitted voltage at a second voltage level corresponding to the second current limit provided by the device connector.

22. The method of claim 21, wherein the first voltage level is lower than the second voltage level.

23. The method of claim 18, wherein the host connector further comprises:
detecting, by the host connector, a presence of a supplemental voltage or a lack of the supplemental voltage;
when the supplemental voltage is not present, producing the transmitted voltage at a first level indicative of the lack of the supplemental voltage; and
when the supplemental voltage is present, producing the transmitted voltage at a second level indicative of the presence of the supplemental voltage.

24. The method of claim 18, wherein:
the determining of the current limit of the one or more devices coupled to the active optical cable assembly comprises receiving, by a host universal serial bus PD controller, a current limit of a host coupled to the host connector;

the limiting of the current provided to the device coupled to the device connector based on the transmitted voltage further comprises:

receiving, by a device universal serial bus PD controller, a voltage level of the transmitted voltage;

providing, by the device universal serial bus PD controller, the current limit of the host to the device;

negotiating, by the device universal serial bus PD controller, a device current limit with the device; and providing, by the device universal serial bus PD controller, the device current limit to a current limiting circuit.

\* \* \* \* \*